US007106403B2

(12) United States Patent
Murai et al.

(10) Patent No.: US 7,106,403 B2
(45) Date of Patent: Sep. 12, 2006

(54) TRANSFLECTIVE DISPLAY WITH THROUGH HOLE EXTENDING THROUGH A LIGHT SHIELD IN THE TRANSMISSIVE REGION OF THE DISPLAY

(75) Inventors: Hiroyuki Murai, Hyogo (JP); Yasushi Matsui, Kumamoto (JP)

(73) Assignees: Mitsubishi Denki Kabushiki Kaisha, Tokyo (JP); Advanced Display Inc., Kumamto (JP)

( * ) Notice: Subject to any disclaimer, the term of this patent is extended or adjusted under 35 U.S.C. 154(b) by 0 days.

(21) Appl. No.: 10/464,772

(22) Filed: Jun. 19, 2003

(65) Prior Publication Data

US 2004/0125325 A1 Jul. 1, 2004

(30) Foreign Application Priority Data

Dec. 27, 2002 (JP) .............................. 2002-380467

(51) Int. Cl.
G02F 1/1335 (2006.01)
(52) U.S. Cl. ...................................... 349/114; 349/158
(58) Field of Classification Search ........ 349/113–114, 349/111, 123, 138, 158
See application file for complete search history.

(56) References Cited

U.S. PATENT DOCUMENTS

| 5,585,951 | A  | * | 12/1996 | Noda et al. ................... 349/122 |
| 6,380,995 | B1 | * | 4/2002  | Kim ............................. 349/113 |
| 6,654,076 | B1 | * | 11/2003 | Ha et al. ....................... 349/43 |
| 6,710,827 | B1 | * | 3/2004  | Kubo et al. .................... 349/55 |
| 6,844,955 | B1 |   | 1/2005  | Nimura |
| 6,933,995 | B1 |   | 8/2005  | Fujibayashi et al. |
| 2001/0024254 | A1 | * | 9/2001 | Kwak et al. ................. 349/122 |

FOREIGN PATENT DOCUMENTS

| JP | 2000-29030 | 1/2000 |
| JP | 2000-171794 | 6/2000 |
| JP | 2000-180881 | 6/2000 |
| JP | 2000-284272 | 10/2000 |
| JP | 2001-221995 | 8/2001 |
| JP | 2001-350158 | 12/2001 |
| JP | 2003-57640 A | 2/2003 |
| JP | 2004-061849 | 2/2004 |
| KR | 2002-0087885 | 6/2002 |
| KR | 2002-0067885 | 8/2002 |
| KR | 2003-0051328 | 6/2003 |
| KR | 2003-0051329 | 8/2003 |

* cited by examiner

Primary Examiner—Andrew Schechter
Assistant Examiner—Phu Vu
(74) Attorney, Agent, or Firm—McDermott Will & Emery LLP

(57) ABSTRACT

A method of manufacturing a semitransparent display device includes the steps of forming a light shield film over a transparent display region on a transparent substrate, applying a photosensitive organic film over the transparent substrate coated with the light shield film, exposing and developing the photosensitive organic film to form a through hole extending through the photosensitive organic film in the transparent display region, removing the light shield film exposed through the through hole after forming the through hole, and forming a reflective film above the photosensitive organic film to form a reflective display region. Thereby, such a situation can be prevented that light reflected by a stage after passing through a TFT array substrate causes visible irregularities in thickness of an organic flattening film during exposure processing for forming the organic flattening film.

12 Claims, 15 Drawing Sheets

TRANSFLECTIVE DISPLAY WITH THROUGH HOLE EXTENDING THROUGH A LIGHT SHIELD IN THE TRANSMISSIVE REGION OF THE DISPLAY

BACKGROUND OF THE INVENTION

1. Field of the Invention

The present invention relates to a method of manufacturing a semitransparent display device and a semitransparent display device, and particularly to improvements in a manufacturing method and a structure of a semitransparent display device, which has a transparent display region and a reflective display region, for increasing a display quality of the reflective display region.

2. Description of the Background Art

Display devices used in portable information terminals called PDAs (Personal Digital Assistants) and portable communication terminals such as cellular phones are required to have thin and light structures, to operate with low power consumption and to achieve high visibility in various environments. Liquid crystal displays, which can inherently achieve thin and light structures as well as low power consumption, have been widely used as the display devices of such portable terminals.

The liquid crystal display device differs from a CRT (Cathode-Ray Tube), a PDP (Plasma Display Panel) and others in that a liquid crystal panel itself, which provides image information, does not emit light. Therefore, the liquid crystal display devices can be roughly classified into two types, i.e., a transparent type allowing passing of light emitted from a light source called a backlight, and a reflective type using a reflector for reflecting incoming external light.

The reflective type can provide a high visibility in a bright place, but cannot avoid remarkably lowing of visibility in a dark place. Conversely, the transparent type cannot provide a high visibility in a bright place, and further requires a larger amount of energy consumption because the backlight consumes a power accounting for a large proportion of the whole power consumption of the liquid crystal display device.

In view of the above, a liquid crystal display device of a semitransparent type has been developed. In semitransparent type, a transparent display region allowing passing of light emitted from a backlight is formed in a portion of a display region, and a reflective display region reflecting incoming external light is also formed in the other portion of the display region. This type of liquid crystal display device having both the features of the transparent and reflective types can provide high visibility in various environments.

In general, a liquid crystal panel includes a TFT (Thin Film Transistor) array substrate, which is provided with a large number of thin film transistors formed in a matrix form on a glass substrate, a color filter, which has color patterns formed on a glass substrate and is arranged over the TFT array substrate, and liquid crystal filling a space between the TFT array substrate and the color filter. This liquid crystal display device performs image displaying by controlling orientation of the liquid crystal within the space.

The liquid crystal display devices of the above type are disclosed, e.g., in Japanese Patent Laying-Open Nos. 2000-29030, 2000-171794, 2000-180881, 2000-284272, 2001-221995 and 2001-350158.

In a process of manufacturing the TFT array substrate of the conventional semitransparent liquid crystal display device, thin film transistors, each of which is formed of a gate electrode, a gate insulating film, a semiconductor layer, a source electrode and a drain electrode, and an interlayer insulating film are formed on a glass substrate. For forming an organic flattening film on the glass substrate, a photosensitive organic material is applied over the glass substrate, and exposure processing is effected thereon.

The exposure as well as development and burning processing are effected on the photosensitive organic material thus applied to form the organic flattening film having through openings in a transparent display region and a contact region. By forming transparent electrodes on the transparent display region, the region can function as a display device of the transparent type. A reflective film may be formed on the organic flattening film and the contact region to provide a reflective display region, whereby this region can function as a display device of the reflective type.

In the processing of exposing the photosensitive organic film, UV (ultraviolet) light is emitted to the transparent display region and the contact region through a photomask to expose only the photosensitive organic film arranged over these regions to the emitted light so that an intended photosensitive organic film can be formed. However, the emitted UV light passes through the gate insulating film made of a silicon nitride film and the interlayer insulating film, further passes through the glass substrate, and reaches a stage carrying the glass substrate.

Therefore, the light reflected by the stage reenters the TFT array substrate through its backside, and exposes the photosensitive organic film. When the photosensitive organic film arranged over portions other than the transparent display region and contact region is exposed to the reflected light, which cannot be controlled by the mask pattern as described above, this results in a problem that the film thickness of the organic flattening film is locally reduced.

Particularly, the stage is provided with grooves, e.g., of about 1 mm in depth for vacuum suction of the TFT array substrate as well as detection portions for various sensors. If the stage has the grooves, light reflected outside the grooves and light reflected inside the grooves have different intensities, and thus reduce the thickness of the organic flattening film by different amounts, respectively. Therefore, the reflective display region, which is provided by forming the reflective film on the organic flattening film, exhibits variations or irregularities in visibility of display due to a difference in reflectance, which is caused by the grooves and others on the stage, so that the display quality lowers.

SUMMARY OF THE INVENTION

In view of the above, an object of the invention is to provide a method of a semitransparent display device and a semitransparent display device, which can prevent or suppress visible irregularities in thickness of an organic flattening film due to light reflected by a stage after passing through a TFT array substrate, and thereby allows inexpensive manufacturing of the semitransparent display device of high quality.

According to the invention, a method of manufacturing a semitransparent display device includes the following steps.

First, a light shield film is formed over a transparent display region on a transparent substrate. A photosensitive organic film is applied over the transparent substrate coated with the light shield film. The photosensitive organic film is exposed and developed to form a through hole extending through the photosensitive organic film in the transparent display region. After forming the through hole, the light shield film exposed through the through hole is removed. A reflective film is formed above the photosensitive organic film to form a reflective display region.

According to the method of manufacturing the semitransparent display device of the invention, the photosensitive organic film is formed on the substrate having the transparent display region coated with the light shield film, and the light shield film is removed after effecting the exposure on the photosensitive organic film. Therefore, it is possible to prevent or suppress the light emitted toward the transparent display region from passing through the substrate. Accordingly, it is possible to manufacture the semitransparent display device of high quality, which can suppress irregularities in display due to the light reflected by the stage.

According to another aspect of the invention, a semitransparent display device includes a transparent substrate, a light shield film, and a photosensitive organic film. The transparent substrate has a main surface. The light shield film is made of a conductive film or a semiconductor film formed on the main surface of the transparent substrate. The photosensitive organic film is formed on the main surface of the transparent substrate covered with the light shield film. The transparent display region is provided with a through hole extending through the light shield film and the photosensitive organic film, and reaching the main surface of the transparent substrate.

According to still another aspect of the invention, a semitransparent display device includes a transparent substrate and a photosensitive organic film. The transparent substrate has a main surface. The photosensitive organic film is formed on the main surface of the transparent substrate. The transparent display region is provided with a through hole extending through the photosensitive organic film and reaching the main surface of the transparent substrate. The transparent substrate is provided at its main surface with a concavity formed at a peripheral portion of the through hole.

According to the above semitransparent display devices of the above aspects, since light emitted toward the transparent display region can be prevented from passing through the substrate, or such passing can be suppressed to a certain extent. Therefore, it is possible to provide a semitransparent display device of high quality, which can suppress irregularities in display due to light reflected by a stage.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS (First Embodiment)

Figure 1:
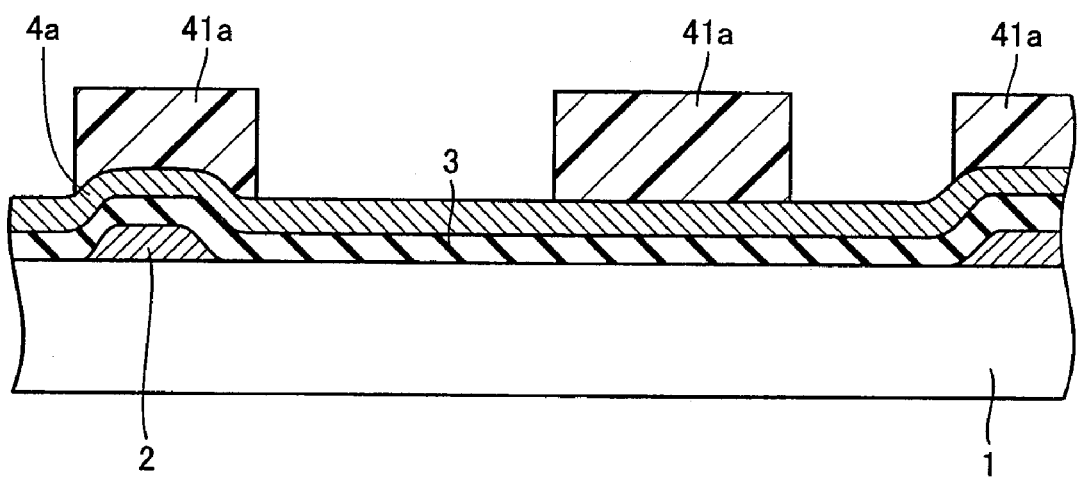
FIGS. 1 to 7 are schematic cross sections of a TFT array substrate forming a liquid crystal display panel, and particularly illustrate, by way of example, steps in a method of manufacturing a semitransparent display device according to a first embodiment of the invention.

Referring to FIG. 1, a transparent substrate 1 is an optically transparent insulating substrate made of glass, plastics or the like, and thin film transistors, transparent pixel electrodes and reflective pixel electrodes are formed on transparent substrate 1. By a sputtering method or the like, a conductive film made of Al (aluminum), Cr (chrome), Mo (molybdenum), W (tungsten), Cu (copper), Ta (tantalum), Ti (titanium) or the like is formed on transparent substrate 1. This conductive film is patterned into a predetermined configuration with a resist (not shown) formed by the photolithography so that a gate electrode 2 is formed.

By a plasma CVD (Chemical Vapor Deposition) method or the like, a gate insulating film 3 made of a silicon nitride film or a silicon oxide film is formed to cover this gate electrode 2. For example, an amorphous silicon film 4*a* and a low-resistance amorphous silicon film (not shown) doped with impurities are successively layered over gate insulating film 3 by a plasma CVD method of the like.

A resist pattern 41*a* is formed by a photolithography method over amorphous silicon film 4*a* and the low-resistance amorphous silicon film doped with impurities. Using resist pattern 41*a* as a mask, etching is effected on amorphous silicon film 4*a* and the low-resistance amorphous silicon film doped with impurities. After this etching, resist pattern 41*a* is removed, e.g., by ashing.

Figure 2:
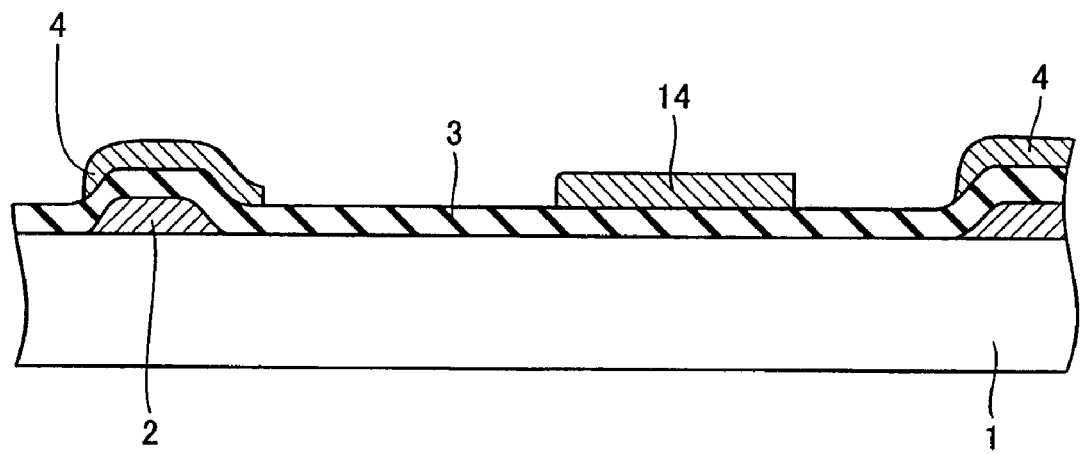

By the above etching, as shown in FIG. 2, amorphous silicon film 4*a* is patterned to form a semiconductor layer 4, and low-resistance amorphous silicon film doped with impurities is patterned to form an ohmic contact layer (not shown). A light shield film 14 is formed over a transparent display region 20 simultaneously with formation of semiconductor layer 4. Thus, light shield film 14 is formed on gate insulating film 3 by patterning amorphous silicon film 4*a* forming semiconductor layer 4.

Light shield film 14 is formed in a region corresponding to transparent display region 20 or in a region, which includes a portion surrounding transparent display region 20 and is wider than transparent display region 20. Light shield film 14 made of the amorphous silicon film is substantially opaque to light emitted for exposing an organic flattening film 7, which will be described later, and intercepts the light emitted to transparent display region 20.

Figure 3:
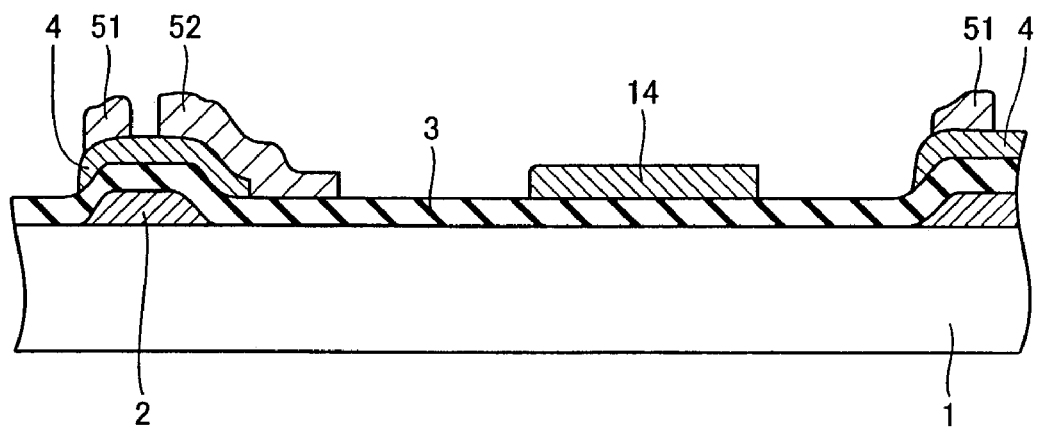

Referring to FIG. 3, a conductive film made of Al, Cr, Mo, W, Cu, Ta, Ti or the like is deposited in the sputtering method or the like, and then is patterned by the photolithography and etching. Thereby, a source electrode 51 and a drain electrode 52 are produced from the conductive film, and the ohmic contact layer not covered with source and drain electrodes 51 and 52 are etched. In this manner, the thin film transistor formed of gate electrode 2, gate insulating film 3, semiconductor layer 4, source electrode 51 and drain electrode 52 is formed.

Figure 4:
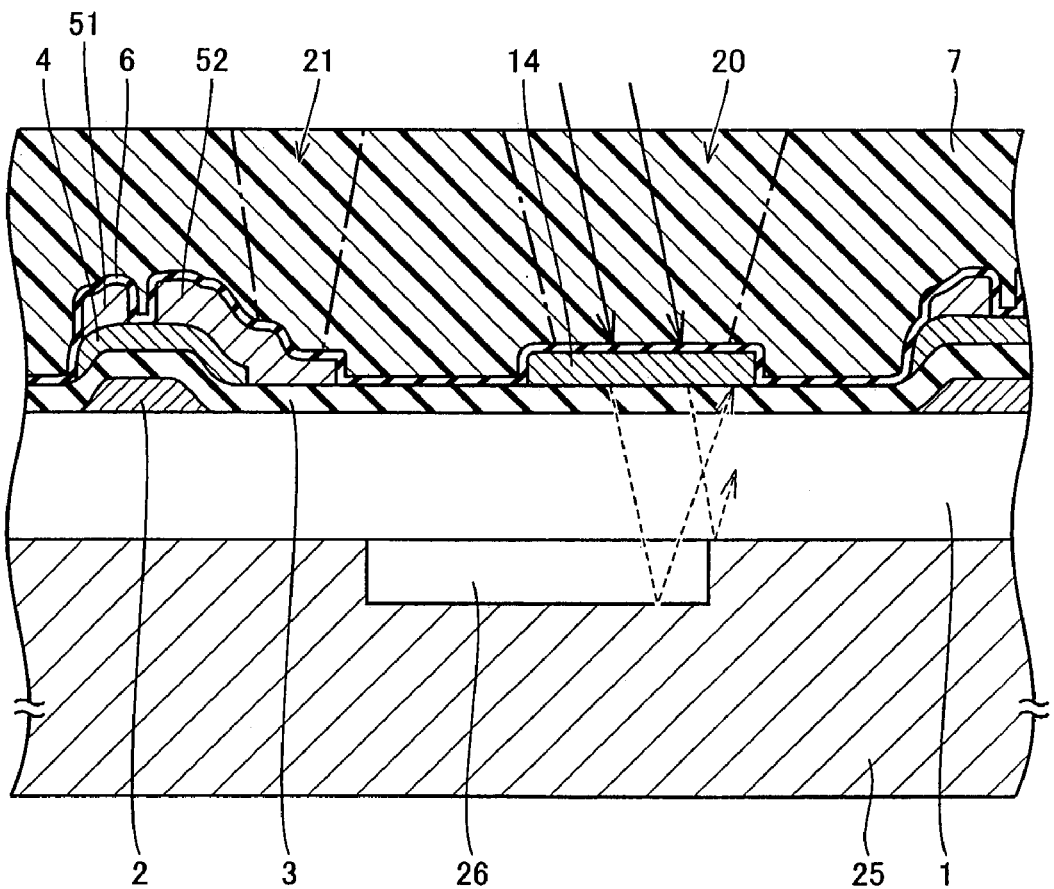

Referring to FIG. 4, a plasma CVD method or the like is performed to form an interlayer insulating film 6 (passivation film) made of, e.g., a silicon nitride film, and then an insulating film 7, which is made of a positive-type photosensitive organic material such as acryl resin or the like having photo-sensitivity, is applied over interlayer insulating film 6, and then exposure is effected. In this exposure processing, transparent substrate 1 is laid on a stage 25 having a groove 26 or the like on its surface, and exposure with UV light or the like is effected on insulating film 7 at a low luminous intensity and at a high luminous intensity. The exposure at a low luminous intensity is effected on a region of the upper surface of insulating film 7, in which irregularities (i.e., concave and convex portions) are to be formed. The exposure at a high luminous intensity is effected on transparent display region 20 and a contact region 21. Since light shield film 14 is present on transparent display region 20, to which the exposure light at the high luminous intensity is emitted, the exposure light, which is emitted toward transparent display region 20 as indicated by solid lines with arrows, is prevented from traveling as indicated by dotted lines with arrows, and thus cannot reach transparent substrate 1 through light shield film 14. After this exposure processing, development and burning are successively effected on insulating film 7.

Figure 5:
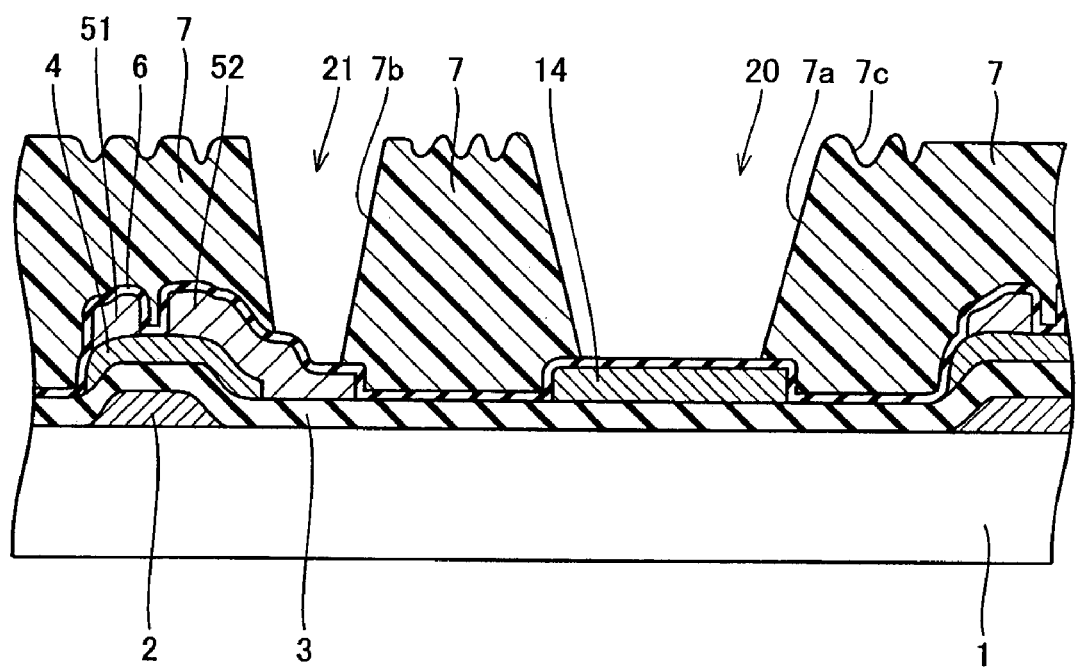

Referring to FIG. 5, the above development and burning produce organic flattening film 7 made of the insulating film. Irregularities 7c are formed at a top surface in the reflective display region of organic flattening film 7, which is already subjected to the exposure at a low luminous intensity, and holes 7a and 7b extending through organic flattening film 7 are formed in a region of organic flattening film 7, which is already subjected to the exposure at a high luminous intensity. Hole 7a is formed in transparent display region 20, and has an opening located above light shield film 14. Hole 7b is formed in contact region 21, and has an opening located above drain electrode 52.

Organic flattening film 7 having the above structure can absorb a difference in level or a stepped portion, which is caused on transparent substrate 1 due to the thin film transistors and electrode interconnections (not shown) such as gate and source interconnections. Thereby, it is possible to prevent formation of large irregularities other than irregularities 7c on the top surface of organic flattening film 7.

Figure 6:
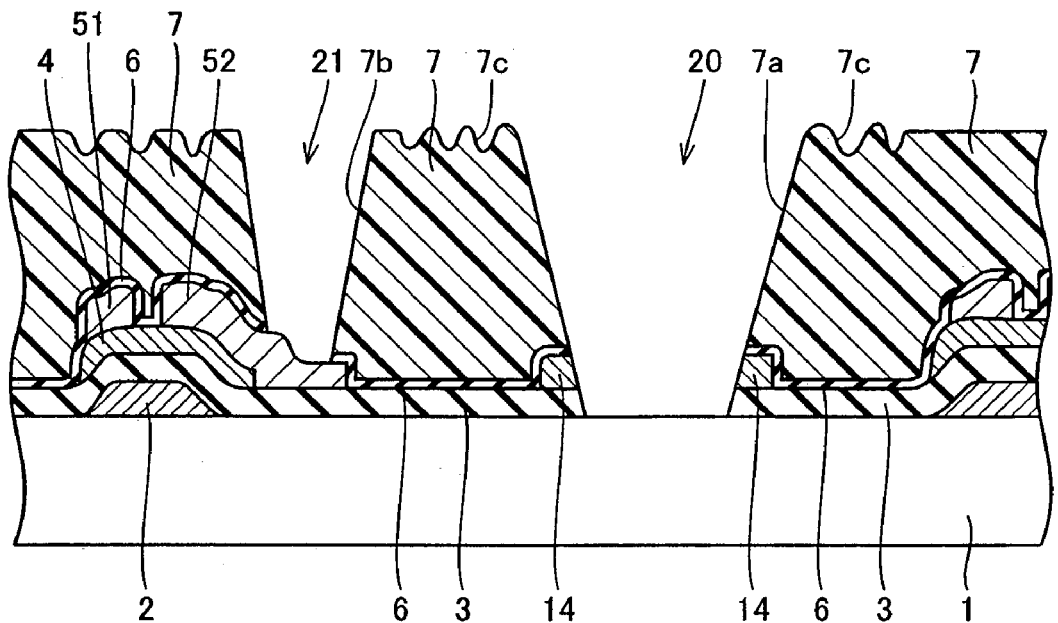

Referring to FIG. 6, dry etching is effected with a mask formed of organic flattening film 7. This etching removes interlayer insulating film 6 from contact region 21 so that drain electrode 52 is uncovered and contact hole 7b is formed. When interlayer insulating film 6 in contact region 21 is etched, interlayer insulating film 6, light shield film 14 and gate insulating film 3 in transparent display region 20 are simultaneously etched to form through hole 7a reaching transparent substrate 1. Therefore, transparent display region 20 is formed of only transparent substrate 1, and becomes transparent to light.

Figure 7:
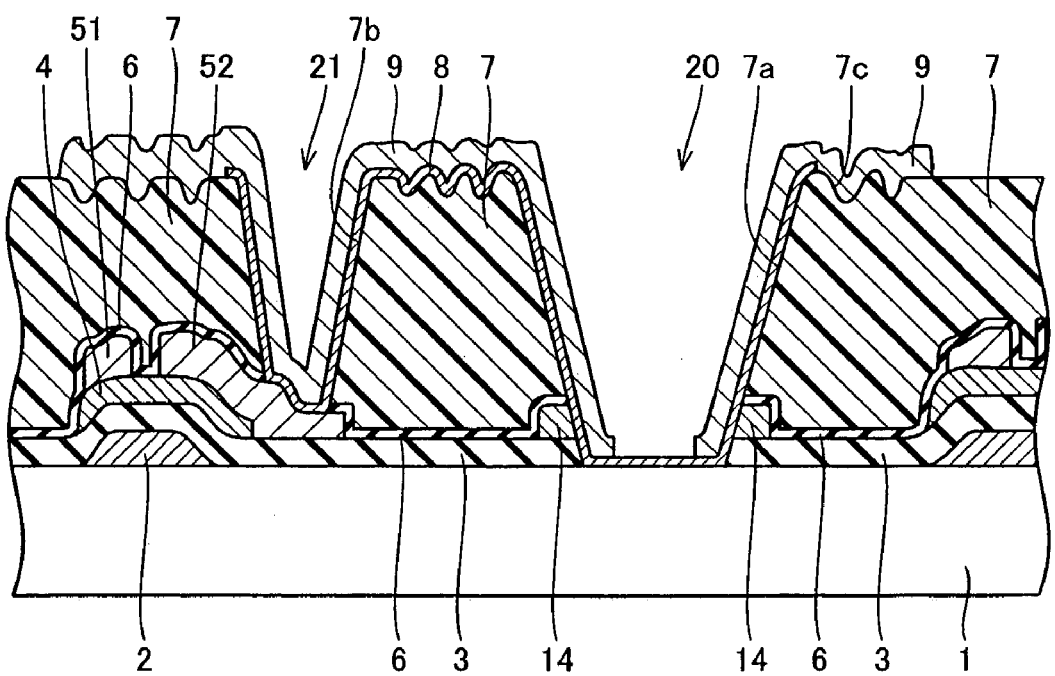

Referring to FIG. 7, an electrically conductive film, which is transparent to light and is made of ITO (Indium-Tin Oxide), is deposited on transparent display region 20, contact region 21 and organic flattening film 7, and is patterned by the photolithography and etching to form a transparent electrode 8. Transparent electrode 8 is electrically connected to drain electrode 52 in contact region 21, and functions as a pixel electrode in transparent display region 20.

On transparent electrode 8 and organic flattening film 7, a metal film, which is made of aluminum or the like having a high reflectance, is deposited, and is patterned by the photolithography and etching so that a reflective film 9 is formed. Reflective film 9 is electrically connected to drain electrode 52 via transparent electrode 8, and functions as the pixel electrode in the reflective display region.

Through the steps described above, the TFT array substrate of the semitransparent display device according to this embodiment is produced.

Description will now be given on the structure of the TFT array substrate produced in the manner described above.

Referring to FIG. 7, the TFT array substrate is provided on transparent substrate 1 with a large number of thin film transistors. Each thin film transistor is formed of gate electrode 2, gate insulating film 3, semiconductor layer 4, source electrode 51 and drain electrode 52.

Gate electrode 2 is formed on transparent substrate 1 with a base film (not shown) therebetween, and is electrically connected to a gate interconnection (not shown). Gate insulating film 3 is formed on a region of transparent substrate 1, which includes a region on gate electrode 2, but does not include a region within transparent display region 20. Semiconductor layer 4 is a channel layer of a thin film transistor, and is formed on gate electrode 2 with gate insulating film 3 therebetween. Light shield film 14, which is made of the same layer as semiconductor layer 4, but is separated therefrom, is formed on gate insulating film 3.

Source electrode 51 and drain electrode 52 are both formed on semiconductor layer 4 with the ohmic contact layer (not shown) therebetween, and source electrode 51 is electrically connected to a source interconnection (not shown).

Interlayer insulating film 6 is formed on the thin film transistor, and particularly is located on a region of transparent substrate 1 not including transparent display region 20 and contact region 21.

Organic flattening film 7 is formed on interlayer insulating film 6. Organic flattening film 7 is located on a region of transparent substrate 1 not including transparent display region 20 and contact region 21, and has a function of absorbing a level difference on transparent substrate 1 for flattening the surface. Also, organic flattening film 7 has a function of irregularly reflecting the incoming external light by fine irregularities 7c on its upper surface.

Gate insulating film 3, light shield film 14, interlayer insulating film 6 and transparent display region 20 of organic flattening film 7 are provided with through hole 7a, which extends through these films 3, 14, 6 and 7, and reaches the surface of transparent substrate 1. Interlayer insulating film 6 and contact region 21 of organic flattening film 7 are provided with through hole (contact hole) 7b extending through these films 6 and 7, and reaching the surface of drain electrode 52.

Transparent electrode 8 is formed at least in transparent display region 20, and is electrically connected to drain electrode 52 via through hole 7b so that transparent electrode 8 functions as the pixel electrode in the transparent display device. Reflective film 9 is formed on transparent electrode 8 and organic flattening film 7 within a pixel region except for transparent display region 20. Reflective film 9 is electrically connected to drain electrode 52 via transparent electrode 8, and thereby it functions as the pixel electrode (reflective electrode) in the reflective display device. Thus, the region provided with reflective film 9 serves as the reflective display region. Since reflective film 9 has the opening within transparent display region 20, light emitted from the backlight can pass through this opening.

In the TFT array substrate described above, since light shield film 14 is wider than transparent display region 20, end portions of light shield film 14 are left around transparent display region 20 after the TFT array substrate is formed. More specifically, light shield film 14 is left around through hole 7a, and has a side surface facing to the sidewall surface of through hole 7a. If through hole 7a extends through a central portion of light shield film 14, the left portion of light shield film 14 surrounds through hole 7a.

According to this embodiment, when the exposure is effected on insulating film 7 at a high luminous intensity as shown in FIG. 4, ultraviolet light or the like is emitted to transparent display region 20 and contact region 21. However, transparent display region 20 is covered with light shield film 14, which is substantially opaque to emitted light (e.g., ultraviolet light) in a short wavelength band used for exposure processing. Therefore, light shield film 14 prevents the emitted light from passing through transparent substrate 1 and reaching stage 25, or significantly reduces an amount of the light passing through transparent substrate 1. Accordingly, it is possible to prevent occurrence of irregularities in thickness of organic flattening film 7, which are due to a difference in reflectance caused by groove 26 and a sensor portion on stage 25, and therefore, irregularities in display on reflective display region can be prevented. Thereby, it is possible to produce the semitransparent display device of a high quality, which can suppress irregularities in display.

Particularly, according to this embodiment, the amorphous silicon film provided for forming semiconductor layer 4 in the thin film transistor is used to form light shield film 14, and is patterned together with semiconductor layer 4. Therefore, light shield film 14 can be formed without adding a new step so that the semitransparent display device of a high quality, which can suppress irregularities in display, can be produced inexpensively.

In the step of removing interlayer insulating film 6 to form contact hole 7b, light shield film 14 is also removed. Therefore, light shield film 14 can be removed without adding a new step so that the semitransparent display device of a high quality, which can suppress irregularities in display, can be produced inexpensively.

Light shield film 14 is formed in the region corresponding to transparent display region 20 or a region, which is wider than transparent display region 20 and includes a portion surrounding transparent display region 20. This can effectively prevent the light emitted toward the transparent display region from passing through the substrate.

(Second Embodiment)

In the first embodiment described above, the amorphous silicon film is used as the light shield film, and the light shield film is formed simultaneously with formation of the semiconductor layer of the thin film transistor. However, a second embodiment will now be described below in connection with an example, in which the light shield film is formed of an electrically conductive film, and the light shield film is formed simultaneously with formation of the source and drain electrodes.

Figure 8:
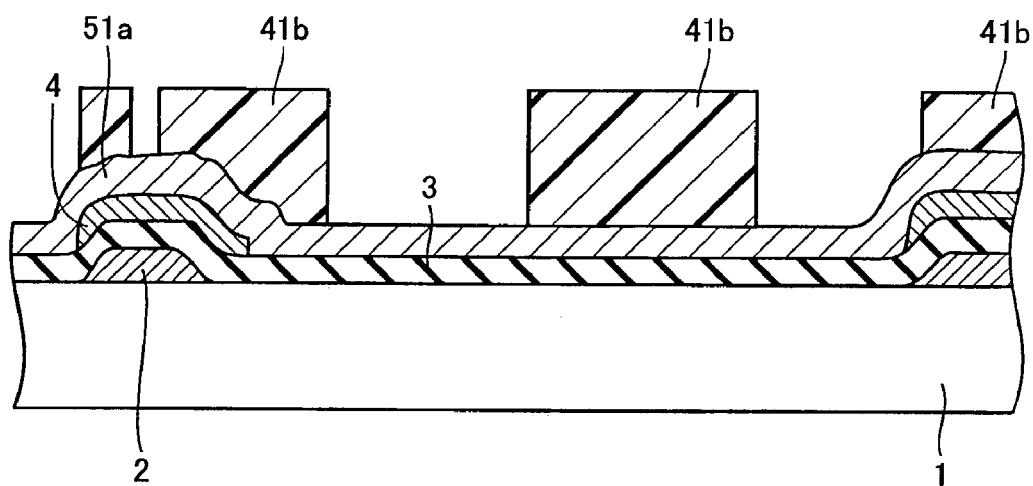
FIGS. 8 to 12 are schematic cross sections of a TFT array substrate forming a liquid crystal display panel, and particularly illustrate, by way of example, steps in a method of manufacturing a semitransparent display device according to a second embodiment of the invention.

Referring to FIG. 8, transparent substrate 1, gate electrode 2 and gate insulating film 3 are formed in a manner similar to that of the first embodiment.

On gate insulating film 3, a film such as an amorphous silicon film and a low-resistance amorphous silicon film (not shown) doped with impurities are successively formed in the plasma CVD method or the like. This amorphous silicon film and the low-resistance amorphous silicon film doped with impurities are patterned by the photolithography method and etching so that semiconductor layer 4a is produced from the amorphous silicon film, and an ohmic contact layer (not shown) is produced from the low-resistance amorphous silicon film doped with impurities.

A conductive film 51a made of Al, Cr, Mo, W, Cu, Ta, Ti or the like is deposited in the sputtering method or the like. A resist pattern 41b is formed on conductive film 51a by the photolithography. Etching is effected on conductive film 51a masked with resist pattern 41b. After this etching, resist pattern 41b is removed, e.g., by ashing.

Figure 9:
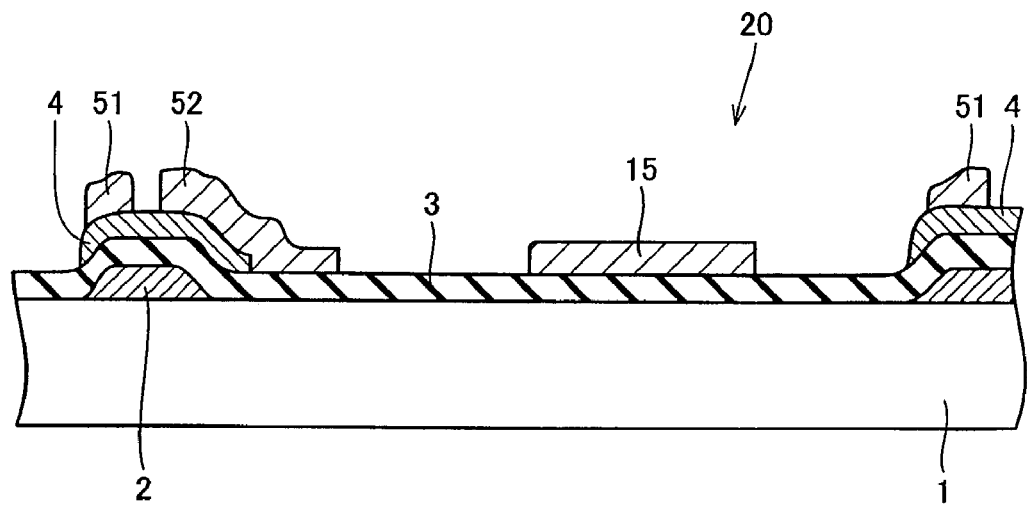

Referring to FIG. 9, the foregoing etching patterns conductive film 51a so that source and drain electrodes 51 and 52 are produced from conductive film 51a, and at the same time, a light shield film 15 is produced from conductive film 51a in transparent display region 20. Simultaneously with formation of light shield film 15 and source and drain electrodes 51 and 52, etching is effected on the ohmic contact layer not covered with light shield film 15 and source and drain electrodes 51 and 52. In this manner, the thin film transistor formed of gate electrode 2, gate insulating film 3, semiconductor layer 4, source electrode 51 and drain electrode 52 is produced.

Light shield film 15 is formed in a region corresponding to transparent display region 20 or in a region, which includes a portion surrounding transparent display region 20 and is wider than transparent display region 20. Light shield film 15 made of the conductive film is substantially opaque to the light emitted for the exposing processing of organic flattening film 7, which will be described later, and thus intercepts the light emitted toward transparent display region 20.

Figure 10:
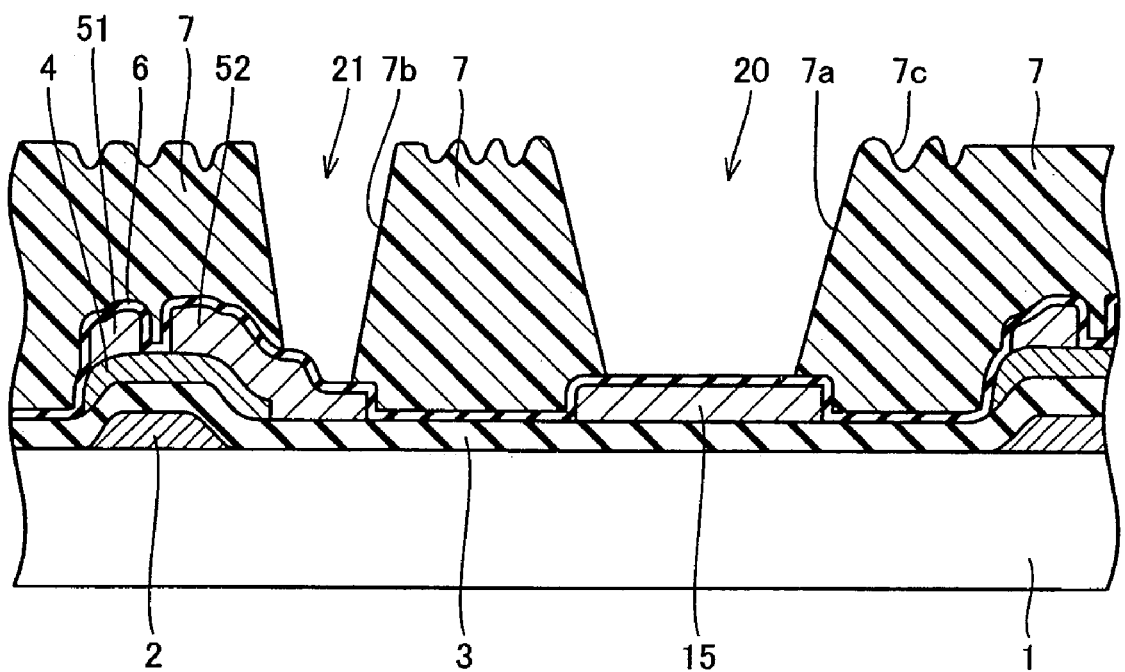

Referring to FIG. 10, interlayer insulating film 6 (passivation film) made of, e.g., a silicon nitride film is formed in the plasma CVD method or the like. Then, insulating film 7 made of a positive-type photosensitive organic material such as acryl resin or the like having photo-sensitivity is applied over interlayer insulating film 6, and then exposure is effected. This exposure processing is performed similarly to the first embodiment. After this exposure processing, development and burning are successively effected on insulating film 7.

The above development and burning produce organic flattening film 7 made of the insulating film. Irregularities 7c are formed at a top surface in the reflective display region of organic flattening film 7, which is already subjected to the exposure at a low luminous intensity, and holes 7a and 7b extending through organic flattening film 7 are formed in a region of organic flattening film 7, which is subjected to the exposure at a high luminous intensity. Hole 7a is formed in transparent display region 20, and has an opening located above light shield film 15. Hole 7b is formed in contact region 21, and has an opening located above drain electrode 52.

Organic flattening film 7 having the above structure can absorb a level difference, which is caused on transparent substrate 1 due to the thin film transistors and electrode interconnections (not shown) such as gate and source interconnections. Thereby, it is possible to prevent formation of large irregularities other than irregularities 7c on the top surface of organic flattening film 7.

Figure 11:
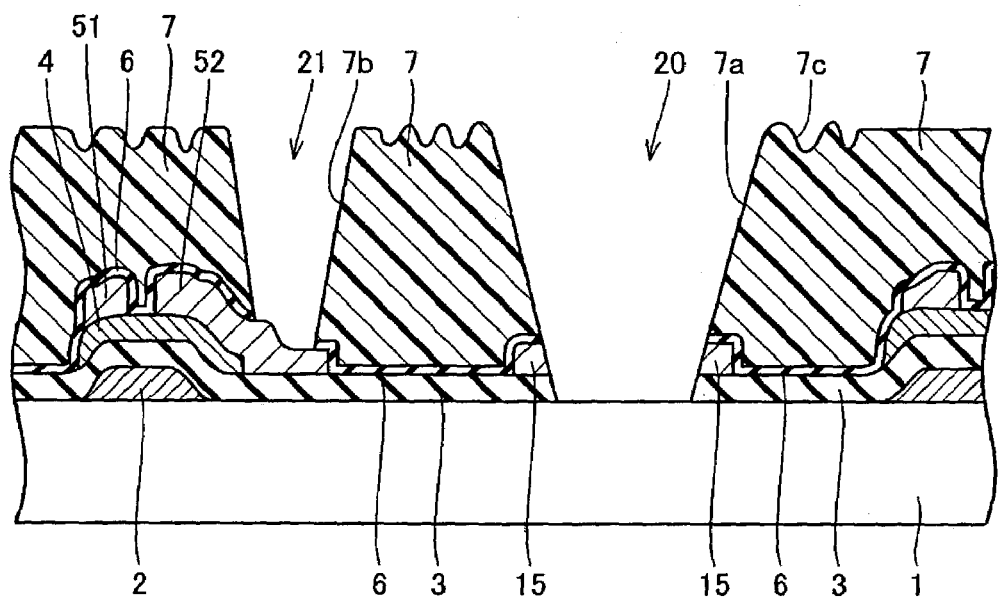

Referring to FIG. 11, dry etching is effected with a mask formed of organic flattening film 7. This etching removes interlayer insulating film 6 from contact region 21 so that drain electrode 52 is uncovered and contact hole 7b is formed. When interlayer insulating film 6 in contact region 21 is etched, interlayer insulating film 6 in transparent display region 20 is simultaneously etched. However, this etching cannot remove light shield film 15 simultaneously with the removal of interlayer insulating film 6. Therefore, light shield film 15 is removed by wet etching in another step after organic flattening film 7 is formed. Thereafter, gate insulating film 3 is removed from transparent display region 20 to form through hole 7a, which extends through organic flattening film 7, interlayer insulating film 6, light shield film 15 and gate insulating film 3, and reaches the surface of transparent substrate 1. Thereby, transparent display region 20 provides a region, which is formed of only transparent substrate 1 and is transparent to the light.

Figure 12:
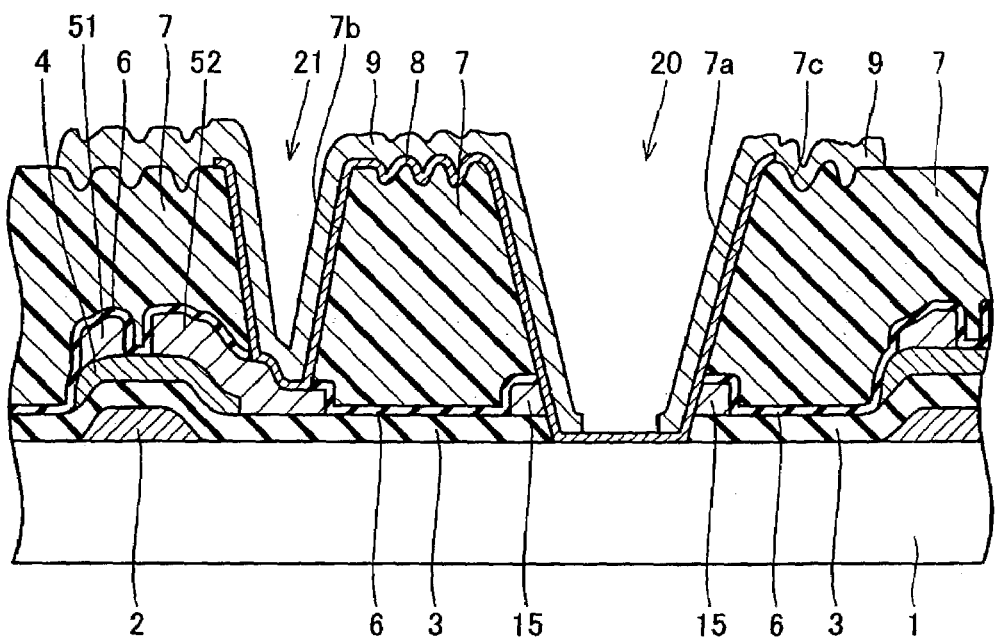

Referring to FIG. 12, an electrically conductive film, which is transparent to light and is made of ITO or the like, is deposited on transparent display region 20, contact region 21 and organic flattening film 7, and is patterned by the photolithography and etching to form transparent electrode 8. Transparent electrode 8 is electrically connected to drain electrode 52 in contact region 21, and functions as a pixel electrode in transparent display region 20.

On transparent electrode 8 and organic flattening film 7, a metal film, which is made of aluminum or the like having a high reflectance, is deposited, and is patterned by the photolithography and etching so that reflective film 9 is formed. Reflective film 9 is electrically connected to drain electrode 52 via transparent electrode 8, and functions as a pixel electrode in the reflective display region.

Through the steps described above, the TFT array substrate of the semitransparent display device according to this embodiment is produced.

Description will now be given on the structure of the TFT array substrate produced in the manner described above.

In the TFT array substrate shown in FIG. 12, light shield film 15, which is formed from a separated portion of the layer forming source and drain electrodes 51 and 52, is the conductive film made of Al, Cr, Mo, W, Cu, Ta, Ti or the like, and thus is made of the same material as source and drain electrodes 51 and 52. Structures other than the above are substantially the same as those of the first embodiment shown in FIG. 7. Therefore, the same portions bear the same reference numbers, and description thereof is not repeated.

According to this embodiment, when the exposure is effected on insulating film 7 at a high luminous intensity as shown in FIG. 10, ultraviolet light or the like is emitted to transparent display region 20 and contact region 21. However, transparent display region 20 is covered with light shield film 15, which is substantially opaque to the emitted light (e.g., ultraviolet light) in a short wavelength band used for the exposure processing. Therefore, light shield film 15 prevents the emitted light from passing through transparent substrate 1 and reaching the underlying stage, or significantly reduces an amount of the light passing through transparent substrate 1. Accordingly, it is possible to prevent occurrence of irregularities in thickness of organic flattening film 7, which are due to a difference in reflectance caused by the groove and sensor portion on the stage, and therefore, irregularities in display on reflective display region 20 can be prevented. Thereby, it is possible to produce the semitransparent display device of a high quality, which can suppress irregularities in display.

Particularly, in this embodiment, light shield film 15 is formed by using conductive film 51a employed for forming source and drain electrodes 51 and 52 of the thin film transistor, and light shield film 15 is patterned together with source and drain electrodes 51 and 52. Therefore, light shield film 15 can be formed without adding a new step so that the semitransparent display device of a high quality, which can suppress irregularities in display, can be produced inexpensively.

Light shield film 15 is formed in the region corresponding to transparent display region 20 or a region, which is wider than transparent display region 20 and includes a portion surrounding transparent display region 20. This can effectively prevent the light emitted toward the transparent display region from passing through the substrate.

(Third Embodiment)

In the second embodiment described above, the light shield film made of the conductive film is formed simultaneously with the formation of the source and drain electrodes of the thin film transistor. However, a third embodiment will now be described below in connection with an example, in which the light shield film is formed simultaneously with formation of the gate electrode.

Figure 13:
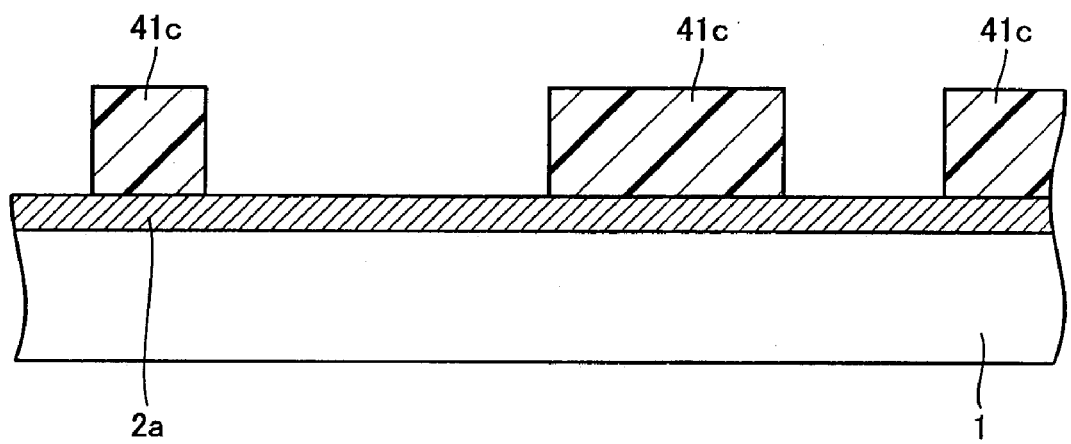
FIGS. 13 to 18 are schematic cross sections of a TFT array substrate forming a liquid crystal display panel, and particularly illustrate, by way of example, steps in a method of manufacturing a semitransparent display device according to a third embodiment of the invention.

Referring to FIG. 13, a conductive film 2a made of Al, Cr, Mo, W, Cu, Ta, Ti or the like is deposited on transparent substrate 1 in the sputtering method or the like. A resist pattern 41c is formed on conductive film 2a by the photolithography. Etching is effected on conductive film 2a masked with resist pattern 41c. After this etching, resist pattern 41c is removed, e.g., by ashing.

Figure 14:
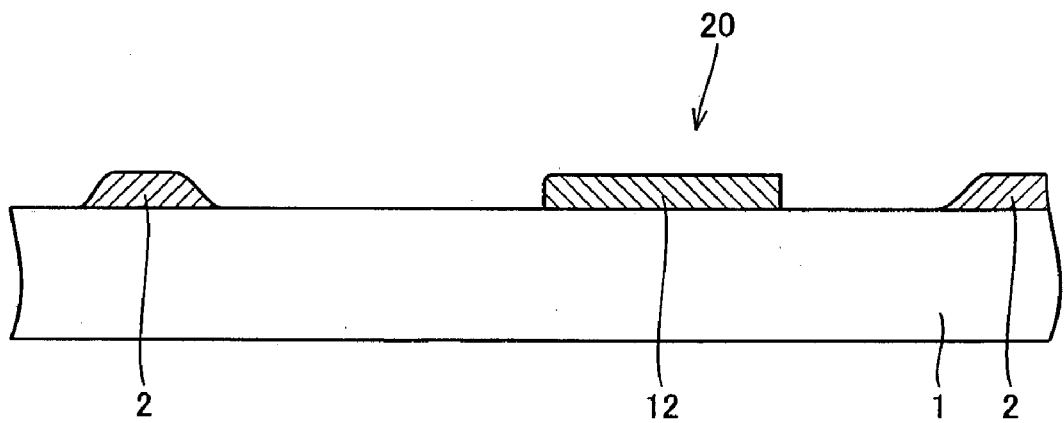

Referring to FIG. 14, the foregoing etching patterns conductive film 2a so that gate electrode 2 is produced from conductive film 2a, and at the same time, a light shield film 12 is produced from conductive film 2a in transparent display region 20.

Light shield film 12 is formed in a region corresponding to transparent display region 20 or in a region, which includes a portion surrounding transparent display region 20 and is wider than transparent display region 20. Light shield film 12 made of the conductive film is substantially opaque to the light emitted for the exposing processing of organic flattening film 7, which will be described later, and thus intercepts the light emitted toward transparent display region 20.

Figure 15:
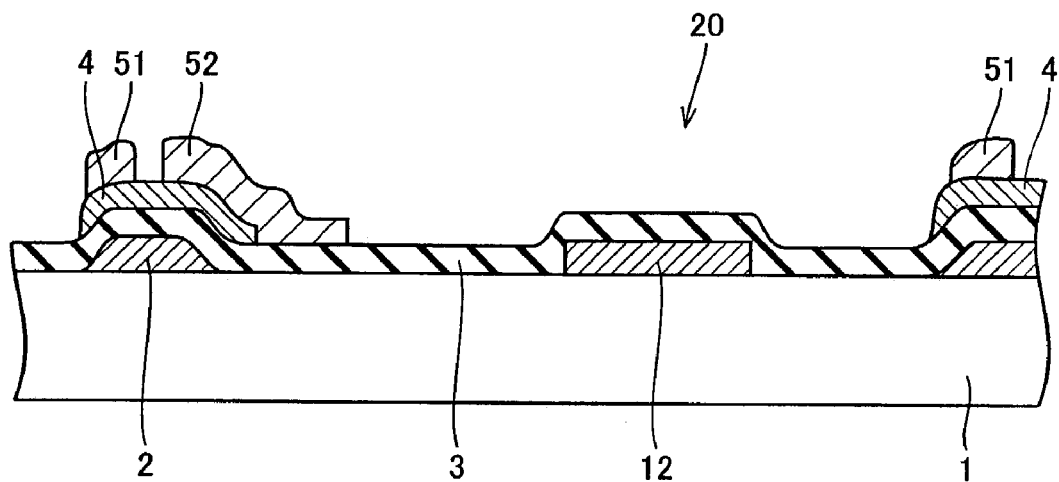

Referring to FIG. 15, gate insulating film 3 covering gate electrode 2 and light shield film 12 is formed over transparent substrate 1 in a manner similar to that in the first embodiment.

On gate insulating film 3, a film such as an amorphous silicon film and a low-resistance amorphous silicon film (not shown) doped with impurities are successively formed in the plasma CVD method or the like. This amorphous silicon film and the low-resistance amorphous silicon film doped with impurities are patterned by the photolithography method and etching so that semiconductor layer 4a is produced from the amorphous silicon film, and an ohmic contact layer (not shown) is produced from the low-resistance amorphous silicon film doped with impurities.

A conductive film made of Al, Cr, Mo, W, Cu, Ta, Ti or the like is deposited in the sputtering method or the like, and then is patterned by the photolithography and etching. Thereby, source and drain electrodes 51 and 52 are produced from the conductive film, and the ohmic contact layer not covered with source and drain electrodes 51 and 52 is etched. In this manner, the thin film transistor formed of gate electrode 2, gate insulating film 3, semiconductor layer 4, source electrode 51 and drain electrode 52 is produced.

Figure 16:
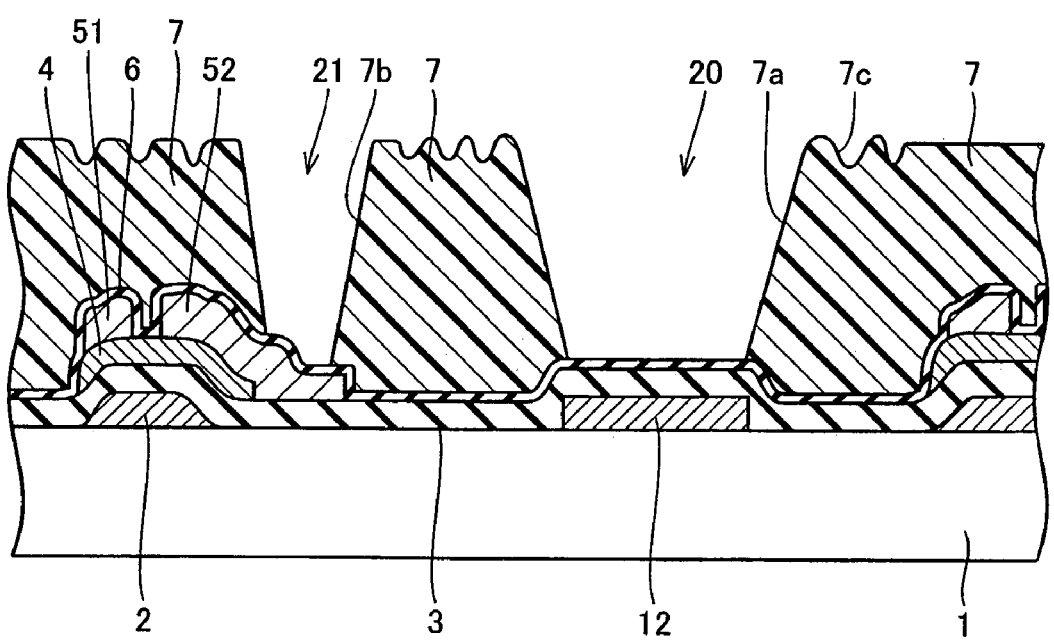

Referring to FIG. 16, interlayer insulating film 6 (passivation film) made of, e.g., a silicon nitride film is formed in the plasma CVD method or the like. Then, insulating film 7 made of a positive-type photosensitive organic material such as acryl resin or the like having photo-sensitivity is applied over interlayer insulating film 6, and then exposure is effected. This exposure processing is performed similarly to the first embodiment. After this exposure processing, development and burning are successively effected on insulating film 7.

The above development and burning produce organic flattening film 7 made of the insulating film. Irregularities 7c are formed at a top surface in the reflective display region of organic flattening film 7, which is subjected to the exposure at a low luminous intensity, and holes 7a and 7b extending through organic flattening film 7 are formed in a region of organic flattening film 7, which is subjected to the exposure at a high luminous intensity. Hole 7a is formed in transparent display region 20, and has an opening located above light shield film 15. Hole 7b is formed in contact region 21, and has an opening located above drain electrode 52.

Organic flattening film 7 having the above structure can absorb a level difference, which is caused on transparent substrate 1 due to the thin film transistors and electrode interconnections (not shown) such as gate and source interconnections. Thereby, it is possible to prevent formation of large irregularities other than irregularities 7c on the top surface of organic flattening film 7.

Figure 17:
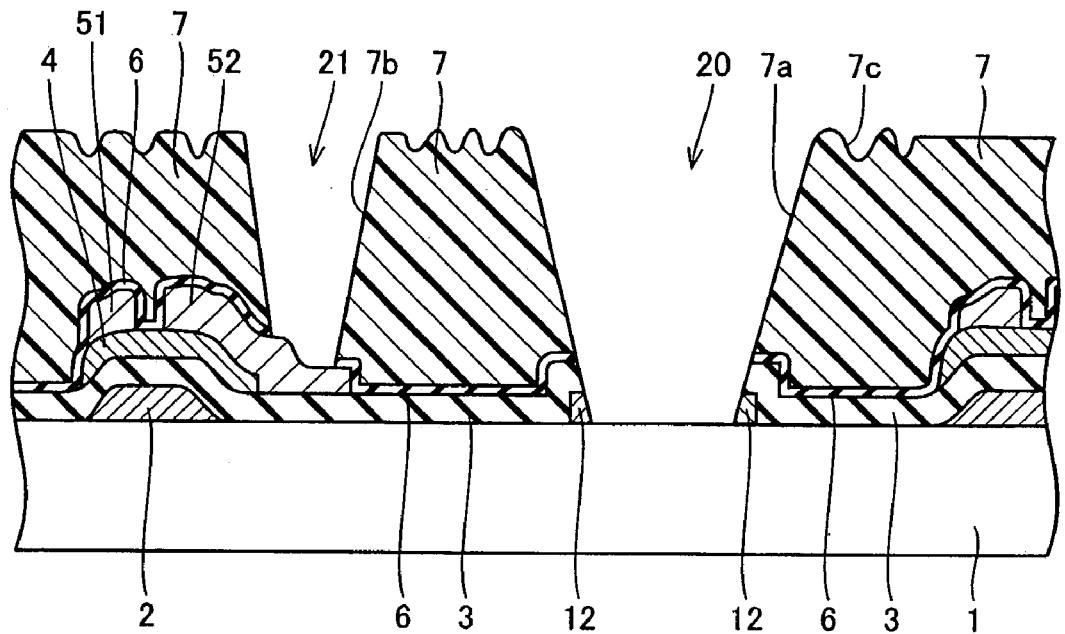

Referring to FIG. 17, dry etching is effected with a mask formed of organic flattening film 7. This etching removes interlayer insulating film 6 from contact region 21 so that drain electrode 52 is uncovered and contact hole 7b is formed. When interlayer insulating film 6 in contact region 21 is etched, interlayer insulating film 6 and gate insulating film 3 in transparent display region 20 are simultaneously etched. However, this etching cannot remove light shield film 12 simultaneously with the removal of interlayer insulating film 6. Therefore, light shield film 12 is removed by wet etching in another step after organic flattening film 7 is formed. This produces through hole 7a, which extends through organic flattening film 7, interlayer insulating film 6, gate insulating film 3 and light shield film 12, and reaches the surface of transparent substrate 1. Thereby, transparent display region 20 provides a region, which is formed of only transparent substrate 1 and is transparent to the light.

Figure 18:
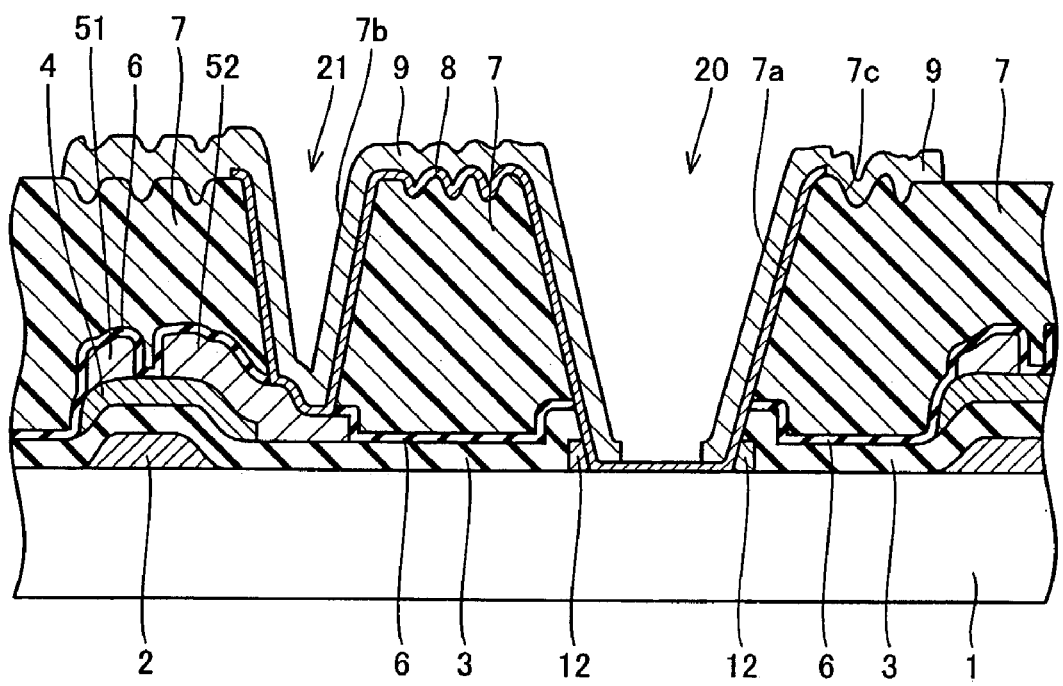

Referring to FIG. 18, an electrically conductive film, which is transparent to light and is made of ITO or the like, is deposited on transparent display region 20, contact region 21 and organic flattening film 7, and is patterned by the photolithography and etching to form transparent electrode 8. Transparent electrode 8 is electrically connected to drain electrode 52 in contact region 21, and functions as a pixel electrode in transparent display region 20.

On transparent electrode 8 and organic flattening film 7, a metal film, which is made of aluminum or the like having a high reflectance, is deposited, and is patterned by the photolithography and etching so that reflective film 9 is formed. Reflective film 9 is electrically connected to drain electrode 52 via transparent electrode 8, and functions as the pixel electrode in the reflective display region.

Through the steps described above, the TFT array substrate of the semitransparent display device according to this embodiment is produced.

Description will now be given on the structure of the TFT array substrate produced in the manner described above.

In the TFT array substrate shown in FIG. 18, light shield film 12, which is formed of a separated portion of the layer forming gate electrode 2, is the conductive film made of Al, Cr, Mo, W, Cu, Ta, Ti or the like. Since light shield film 12 is formed of the separated portion of the layer forming gate electrode 2, it is located between transparent substrate 1 and gate insulating film 3. Structures other than the above are substantially the same as those of the first embodiment shown in FIG. 7. Therefore, the same portions bear the same reference numbers, and description thereof is not repeated.

According to this embodiment, when the exposure is effected on insulating film 7 at a high luminous intensity as shown in FIG. 16, ultraviolet light or the like is emitted to transparent display region 20 and contact region 21. However, transparent display region 20 is covered with light shield film 12, which is substantially opaque to the emitted light (e.g., ultraviolet light) in a short wavelength band used for the exposure processing. Therefore, light shield film 12 prevents the emitted light from passing through transparent substrate 1 and reaching the underlying stage, or significantly reduces an amount of light passing through transparent substrate 1. Accordingly, it is possible to prevent occurrence of irregularities in thickness of organic flattening film 7, which are due to a difference in reflectance caused by the groove and sensor portion on the stage, and therefore, irregularities in display on reflective display region 20 can be prevented. Thereby, it is possible to produce the semitransparent display device of a high quality, which can suppress irregularities in display.

Particularly, in this embodiment, light shield film 12 is formed by using conductive film 2a employed for forming gate electrode 2 of the thin film transistor, and light shield film 12 is patterned together with gate electrode 2. Therefore, light shield film 12 can be formed without adding a new step so that the semitransparent display device of a high quality, which can suppress irregularities in display, can be produced inexpensively.

Light shield film 12 is formed in the region corresponding to transparent display region 20 or a region, which is wider than transparent display region 20 and includes a portion surrounding transparent display region 20. This can effectively prevent the light emitted toward the transparent display region from passing through the substrate.

(Fourth Embodiment)

In the first to third embodiments described above, each of light shield films 14, 15 and 12 is formed in the region corresponding to transparent display region 20 or a region, which is wider than transparent display region 20 and includes a portion surrounding transparent display region 20. However, a fourth embodiment will now be described below in connection with an example, in which the light shield film is formed in a region, which does not contain a peripheral portion (inside the periphery) of transparent display region 20 and is narrower than region 20.

In the first embodiment, etching is effected on the light shield film and gate insulating film 3 masked with organic flattening film 7, which is already subjected to the burning. By etching light shield film 14, gate insulating film 3 underlying light shield film 14 is uncovered, and is etched subsequently to the etching of light shield film 14.

If the etching rate of light shield film 14 is higher than gate insulating film 3, light shield film 14 is etched in the direction parallel to the main surface of the substrate while gate insulating film 3 is being etched. Thus, light shield film 14 in the peripheral portion of transparent display region 20

(i.e., light shield film 14 under organic flattening film 7) is etched to a large extent so that a concavity is formed on a tapered side surface of organic flattening film 7 surrounding transparent display region 20.

In this case, if transparent electrode 8 is made of a material such as ITO having low coverage characteristics, transparent electrode 8 may be cut off by the concavity formed by the overetching of light shield film 14. In this case, the ITO of transparent display region 20 is electrically floated or has a high resistance, and display control cannot be performed in transparent display region 20 in some cases.

This embodiment to be described below relates to a method of manufacturing a semitransparent display device overcoming the above problem.

Figure 20:
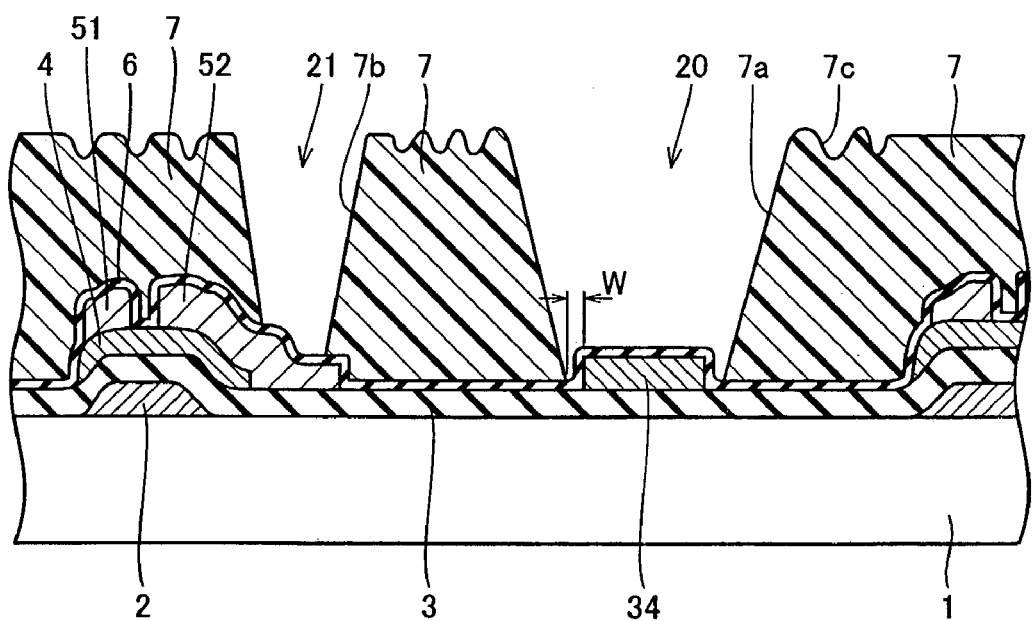
FIGS. 20 and 21 are schematic cross sections of a TFT array substrate forming a liquid crystal display panel, and particularly illustrate, by way of example, steps in a method of manufacturing a semitransparent display device according to a fourth embodiment of the invention.

According to this embodiment shown in FIG. 20, a light shield film 34 made of the same amorphous silicon film as semiconductor layer 4 covers a region of transparent display region 20 not including a peripheral portion thereof, and thus covers a major portion of transparent display region 20, which includes its central portion, and is slightly narrower than transparent display region 20. Light shield film 34 smaller than transparent display region 20 can prevent occurrence of the concavity on the tapered side surface of transparent display region 20.

For preventing protrusion of light shield film 34 beyond transparent display region 20, it is desired to keep a width W of 1 μm or more between the end of light shield film 34 and the end of transparent display region 20, and to locate the end of light shield film 34 at the position shifted toward the center of transparent display region 20. In particular, organic flattening film 7 has a large thickness, and the inclination of the tapered side surface of transparent display region 20 cannot be ignored. Therefore, the patterning accuracy of light shield film 34 is lower than the patterning accuracy of organic flattening film 7. Accordingly, when considered based on the photomasks, it is desired that the end of light shield film 34 is shifted inward from the end of organic flattening film 7 by 2.5 μm or more.

Figure 21:
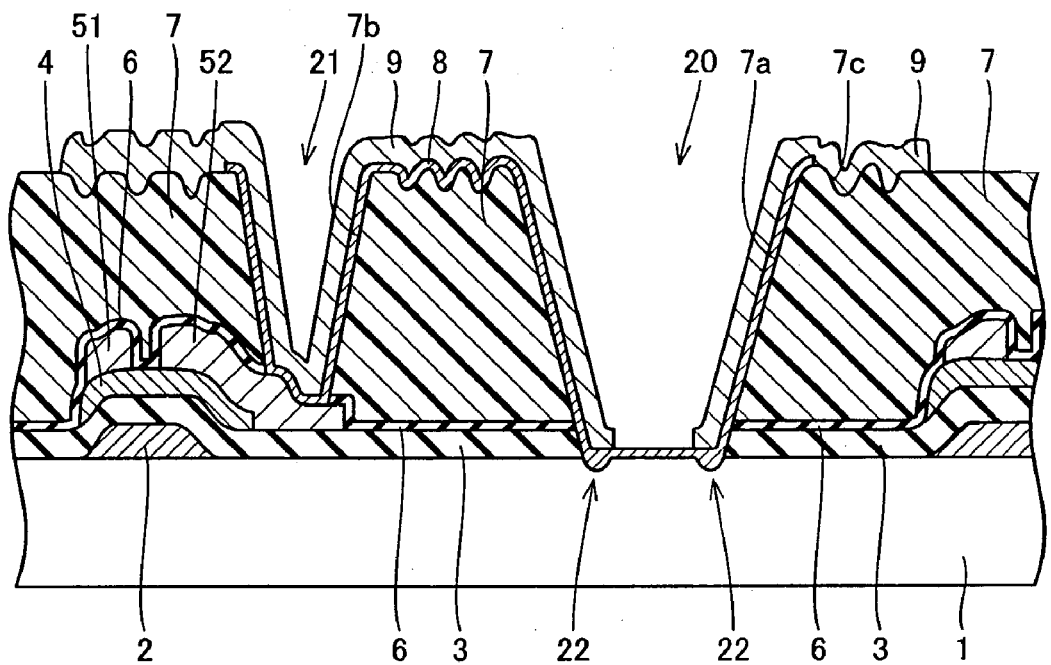

Referring to FIG. 21, when light shield film 34 and gate insulating film 3 are etched, the peripheral portion of transparent display region 20 not covered with light shield film 34 is etched more rapidly than its central portion. In the structure using transparent substrate 1 made of the glass substrate, therefore, the etching of the glass substrate has already started in the peripheral portion of transparent display region 20 when the etching at the central portion of transparent display region 20 is finished. Thereby, the peripheral portion of transparent substrate 1 in transparent display region 20 is etched to a larger extent than its central portion, and a concavity 22 is formed in the peripheral portion. Thus, light shield film 34 does not remain, and concavity 22 is present at the surface portion of transparent substrate 1 defining the periphery of hole 7a. Then, transparent electrode 8 and reflective film 9 are formed similarly to the first embodiment, and the TFT array substrate of the semitransparent display device in this embodiment is produced.

Manufacturing steps other than the above are substantially the same as those in the first embodiment, and therefore, description thereof is not repeated. In the components shown in FIGS. 20 and 21, the same or corresponding components as those in the first embodiment bear the same reference numbers.

According to this embodiment, the light shield film is formed in the portion of the transparent display region except for its peripheral portion. Therefore, even if the transparent electrode having low coverage characteristics is formed, the transparent electrode in the transparent display region can be electrically connected to the drain electrode to control the voltages on the electrodes.

(Fifth Embodiment)

In the fourth embodiment described above, the light shield film smaller than transparent display region 20 is formed simultaneously with the formation of semiconductor layer 4 of the thin film transistor by using the amorphous silicon film. However, a fifth embodiment will now be described below in connection with an example, in which the light shield film is formed simultaneously with the formation of the source and drain electrodes by using the conductive film.

Figure 22:
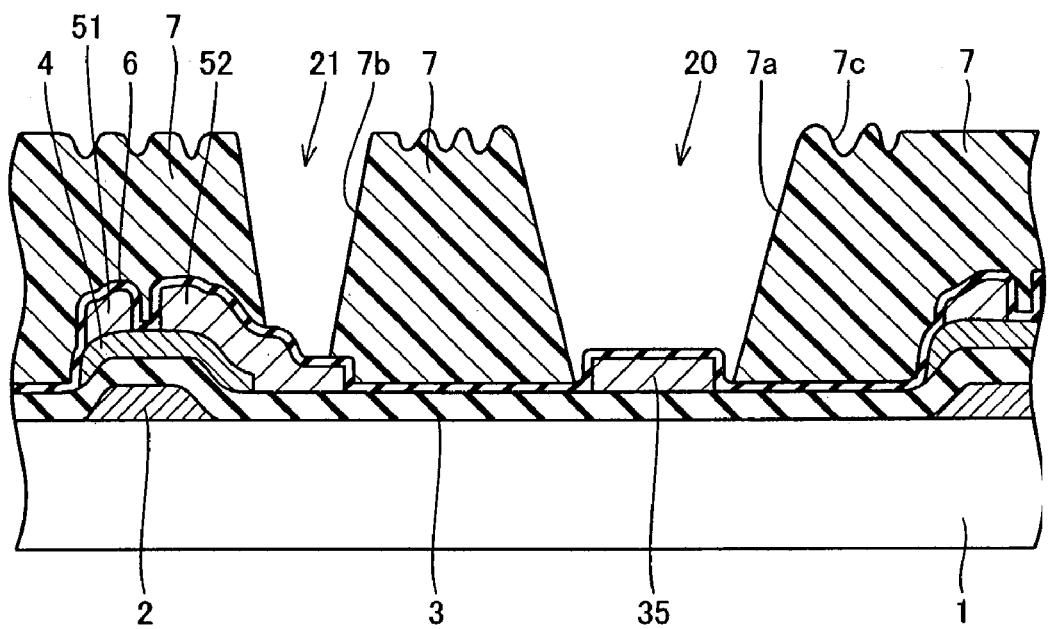
FIG. 22 is a schematic cross section of a TFT array substrate forming a liquid crystal display panel, and particularly illustrates by way of example a method of manufacturing a semitransparent display device according to a fifth embodiment of the invention.

According to this embodiment shown in FIG. 22, a light shield film 35 made of the same material (i.e., Al, Cr, Mo, W, Cu, Ta, Ti or the like) as source and drain electrodes 51 and 52 covers a region of transparent display region 20 not including a peripheral portion thereof, and thus covers a major portion of transparent display region 20, which includes its central portion, and is slightly narrower than transparent display region 20. By forming light shield film 35 smaller than transparent display region 20, it is possible to prevent formation of the concavity on the tapered side surface of transparent display region 20.

For preventing protrusion of light shield film 35 beyond transparent display region 20, it is desired to keep a width W of 1 μm or more between the end of light shield film 35 and the end of transparent display region 20 to locate the end of light shield film 35 at the position shifted toward the center of transparent display region 20. In particular, organic flattening film 7 has a large thickness, and the inclination of the tapered side surface of transparent display region 20 cannot be ignored. Therefore, the patterning accuracy of light shield film 35 is lower than the patterning accuracy of organic flattening film 7. Accordingly, when considered based on the photomasks, it is desired that the end of light shield film 35 is shifted inward from the end of organic flattening film 7 by 2.5 μm or more.

In this state, interlayer insulating film 6, light shield film 34 and gate insulating film 3 are removed by etching through holes 7a and 7b.

Referring to FIG. 21, when light shield film 35 and gate insulating film 3 are etched, the peripheral portion of transparent display region 20 not covered with light shield film 35 is etched more rapidly than its central portion. In the structure using transparent substrate 1 made of the glass substrate, therefore, the etching of the glass substrate has already started in the peripheral portion of transparent display region 20 when the etching at the central portion of transparent display region 20 is finished. Thereby, the peripheral portion of transparent substrate 1 in transparent display region 20 is etched to a larger extent than its central portion, and concavity 22 is formed in the peripheral portion. Thus, light shield film 35 does not remain, and concavity 22 is present at the surface portion of transparent substrate 1 defining the periphery of hole 7a. Then, transparent electrode 8 and reflective film 9 are formed similarly to the second embodiment, and the TFT array substrate of the semitransparent display device in this embodiment is produced.

Manufacturing steps other than the above are substantially the same as those in the second embodiment, and therefore, description thereof is not repeated. In the components shown in FIGS. 20 and 21, the same or corresponding components as those in the second embodiment bear the same reference numbers.

Figure 19:
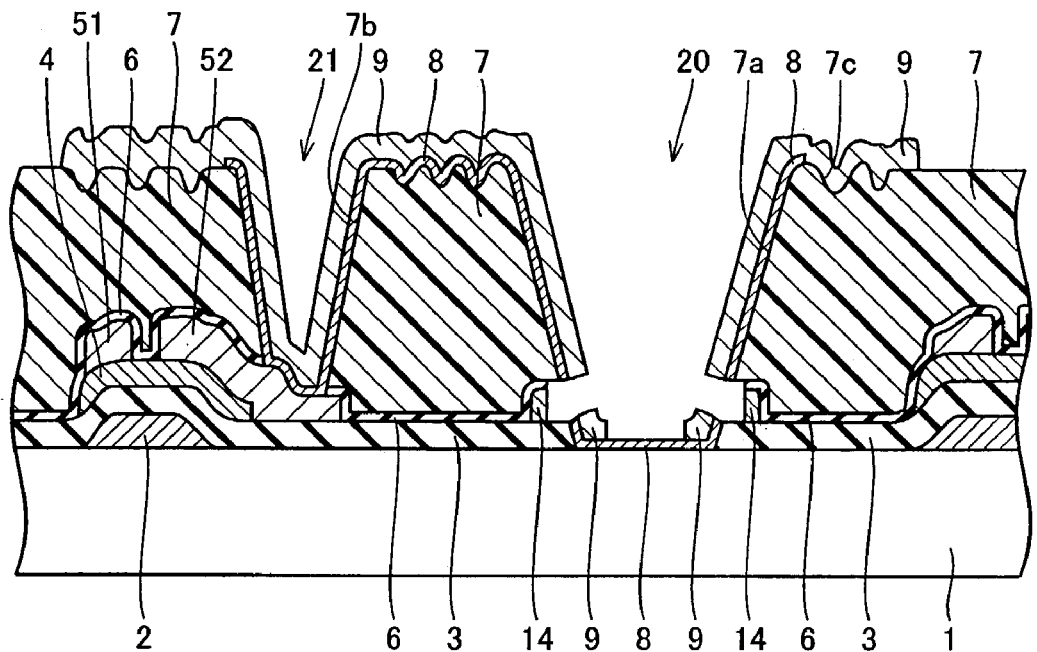
FIG. 19 is a cross section showing a TFT array substrate in the state, where a light shield film is over-etched and the light shield film located around (outside) a transparent display region is etched in the manufacturing method according to the first embodiment of the invention.

In the structure including light shield film 35, which is made of the conductive layer also used for source and drain electrodes 51 and 52, if overetching were caused by the wet etching performed for removing light shield film 35, the concavity would occur in the tapered side surface of transparent display region 20, similarly to the structure shown in FIG. 19.

Similarly to the fourth embodiment, therefore, light shield film 35 is formed over the same region as transparent display region 20 except for its peripheral portion, and thus covers a major portion of transparent display region 2, which includes its central portion, and is slightly narrower than transparent display region 20. Light shield film 35 smaller than transparent display region 20 can prevent occurrence of the concavity on the tapered side surface of transparent display region 20.

(Sixth Embodiment)

In the fifth embodiment described above, the light shield film, which is made of the conductive film and is smaller than transparent display region 20, is formed simultaneously with the formation of the source and drain electrodes of the thin film transistor. However, a sixth embodiment will now be described below in connection with an example, in which the light shield film is formed simultaneously with the formation of the gate electrode.

Figure 23:
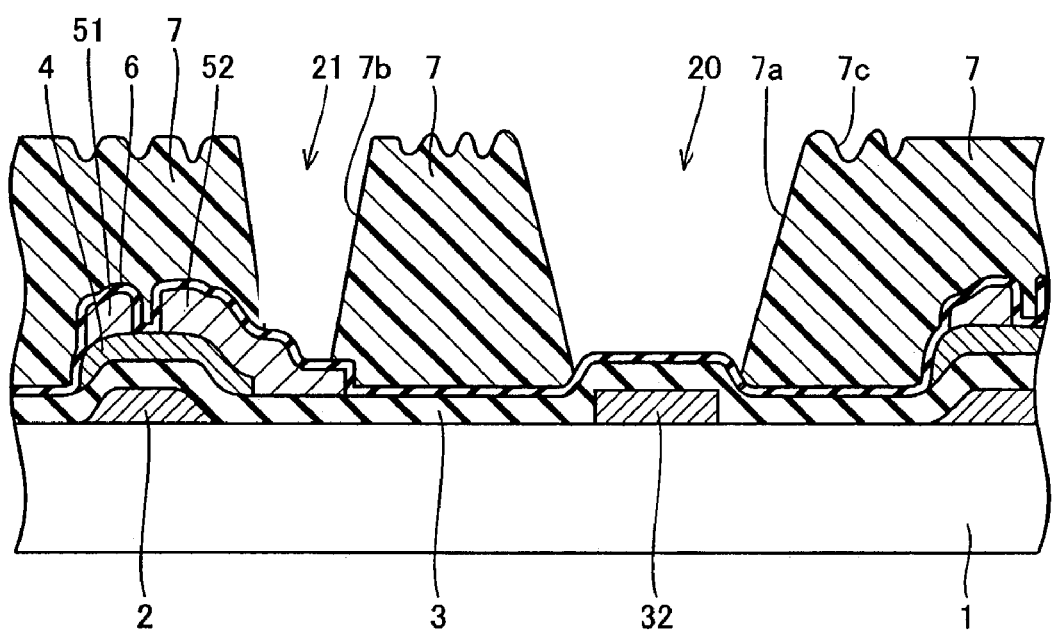
FIG. 23 is a schematic cross section of a TFT array substrate, and particularly illustrates by way of example a method of manufacturing a semitransparent display device according to a sixth embodiment of the invention.

According to this embodiment shown in FIG. 23, a light shield film 32 made of the same material (i.e., Al, Cr, Mo, W, Cu, Ta, Ti or the like) as gate electrode 2 covers a region of transparent display region 20 not including a peripheral portion thereof, and thus covers a major portion of transparent display region 20, which includes its central portion, and is slightly narrower than transparent display region 20. By forming light shield film 32 smaller than transparent display region 20, it is possible to prevent formation of the concavity on the tapered side surface of transparent display region 20.

For preventing protrusion of light shield film 32 beyond transparent display region 20, it is desired to keep a width W of 1 μm or more between the end of light shield film 32 and the end of transparent display region 20 to locate the end of light shield film 32 at the position shifted toward the center of transparent display region 20. In particular, organic flattening film 7 has a large thickness, and the inclination of the tapered side surface of transparent display region 20 cannot be ignored. Therefore, the patterning accuracy of light shield film 32 is lower than the patterning accuracy of organic flattening film 7. Accordingly, when considered based on the photomasks, it is desired that the end of light shield film 32 is shifted inward from the end of organic flattening film 7 by 2.5 μm or more.

In this state, interlayer insulating film 6, light shield film 34 and gate insulating film 3 are removed by etching through holes 7a and 7b.

Referring to FIG. 21, when light shield film 32 and gate insulating film 3 are etched, the peripheral portion of transparent display region 20 not covered with light shield film 32 is etched more rapidly than its central portion. In the structure using transparent substrate 1 made of the glass substrate, therefore, the etching of the glass substrate has already started in the peripheral portion of transparent display region 20 when the etching at the central portion of transparent display region 20 is finished. Thereby, the peripheral portion of transparent substrate 1 in transparent display region 20 is etched to a larger extent than its central portion, and concavity 22 is formed in the peripheral portion. Thus, light shield film 32 does not remain, and concavity 22 is present at the surface portion of transparent substrate 1 defining the periphery of hole 7a. Then, transparent electrode 8 and reflective film 9 are formed similarly to the second embodiment, and the TFT array substrate of the semitransparent display device in this embodiment is produced.

Manufacturing steps other than the above are substantially the same as those in the third embodiment, and therefore, description thereof is not repeated. In the components shown in FIG. 23, the same or corresponding components as those in the second embodiment bear the same reference numbers.

In the structure including light shield film 32, which is made of the conductive layer also used for gate electrode 2, if overetching were caused by the wet etching performed for removing light shield film 35, the concavity would occur in the tapered side surface of transparent display region 20, similarly to the structure shown in FIG. 19.

Similarly to the fourth embodiment, therefore, light shield film 32 is formed over the same region as transparent display region 20 except for its peripheral portion, and covers a major portion of transparent display region 2, which includes its central portion, and is slightly narrower than transparent display region 20. Light shield film 32 smaller than transparent display region 20 can prevent occurrence of the concavity on the tapered side surface of transparent display region 20.

The embodiments have been illustrated in connection with the TFT array substrates. Structures of the liquid crystal display devices using these TFT array substrates will now be described with reference to the first to fourth embodiments.

Figure 24:
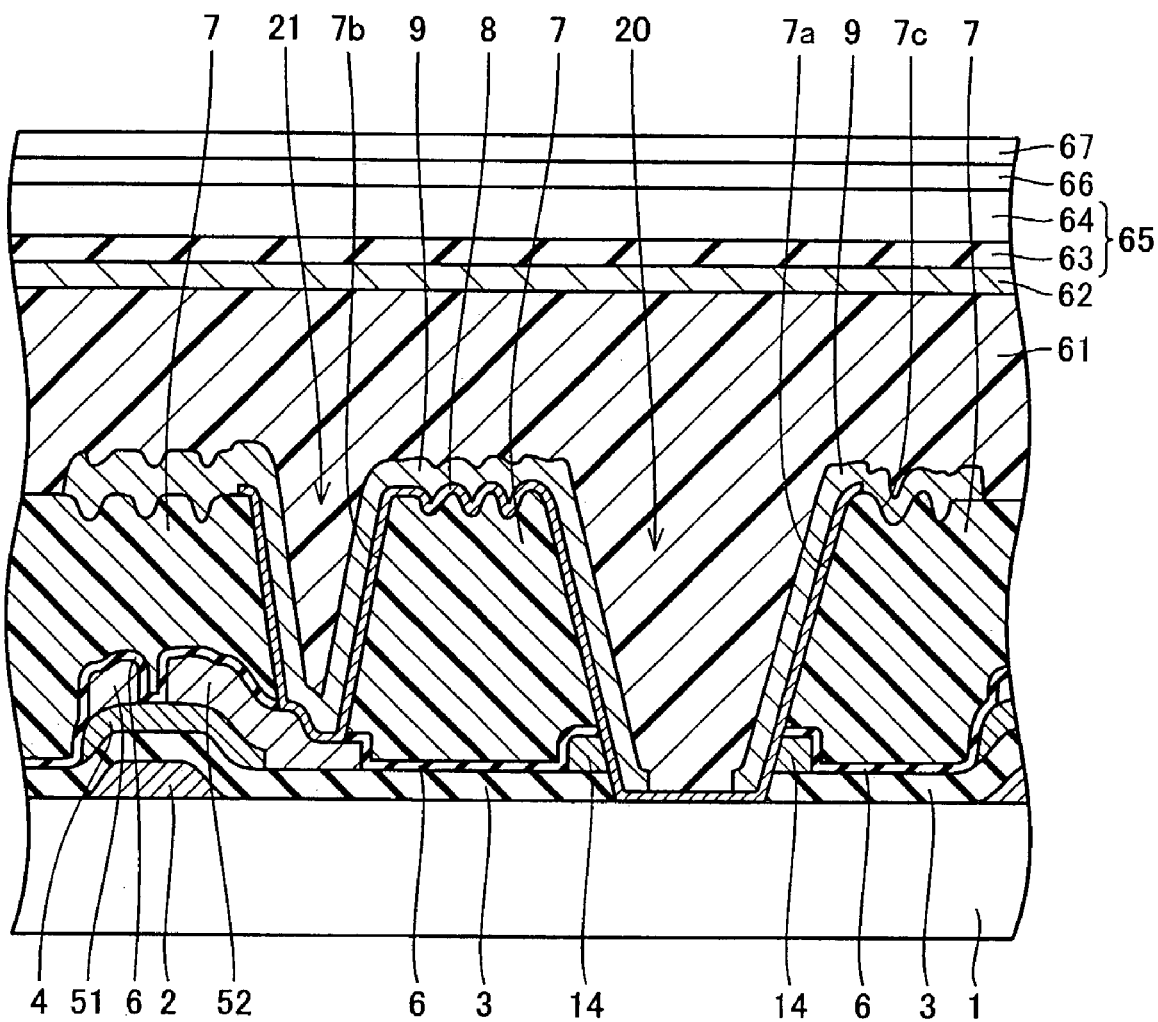
FIG. 24 is a schematic cross section showing a structure of a liquid crystal display device using the TFT array of the first embodiment.

Referring to FIG. 24, the liquid crystal display device is formed of the TFT array substrate according to the first embodiment, a color filter substrate 65, which is formed of a glass substrate 64 and a color filter 63 arranged thereon, and is joined to the THF array substrate, and a liquid crystal layer 61 filling a space between the TFT array substrate and color filter substrate 65. An ITO electrode 62 is formed on a front surface of color filter substrate 65 facing to liquid crystal layer 61, and a phase plate 66 and a deflection plate 67 are arranged on the rear side thereof.

The TFT array substrates in the second and third embodiments can form the liquid crystal display devices similarly to the above.

Figure 25:
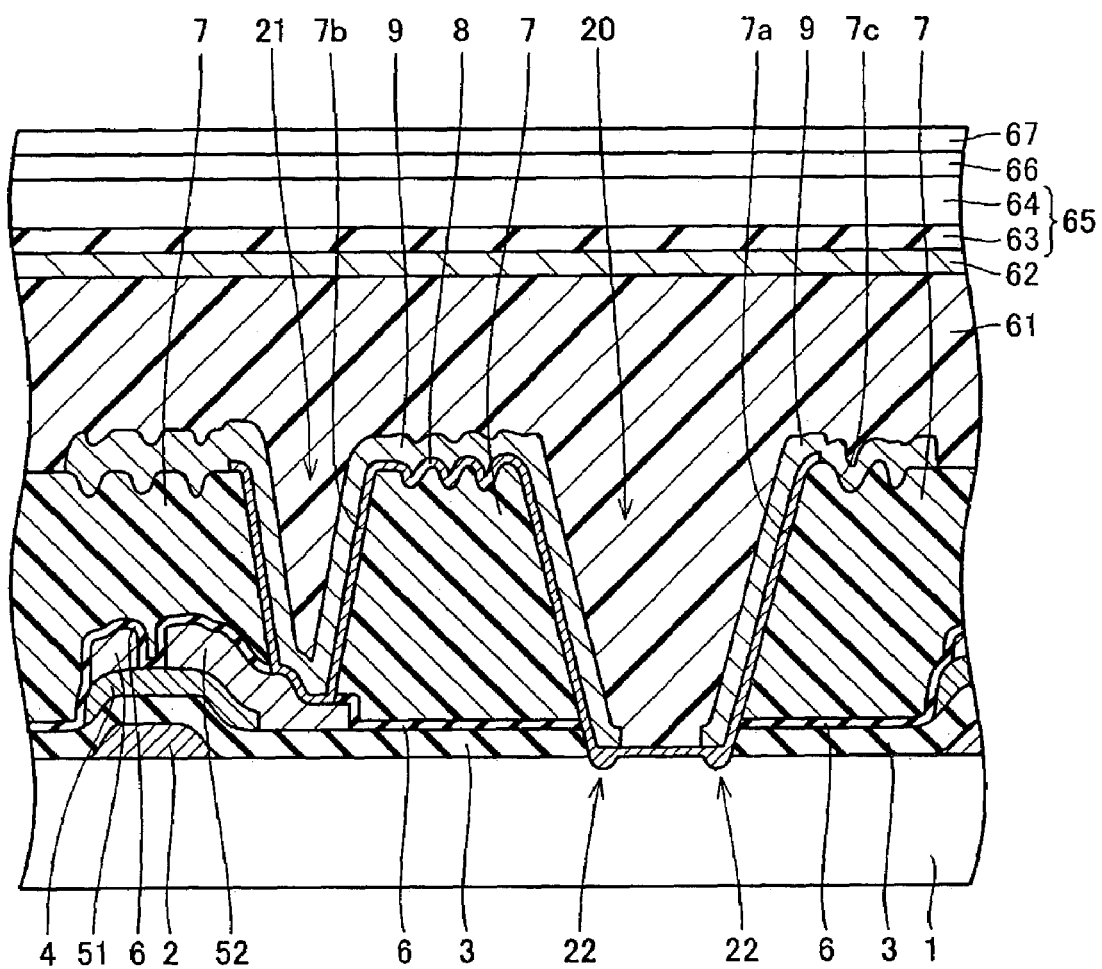
FIG. 25 is a schematic cross section showing a structure of a liquid crystal display device using the TFT array of the fourth embodiment.

FIG. 25 shows a structure of a liquid crystal display device employing the TFT array substrate according to the fourth embodiment. Referring to FIG. 25, the TFT array substrate of the fourth embodiment forms the liquid crystal display device similarly to the above.

The TFT array substrates in the fifth and sixth embodiments can form the liquid crystal display devices similarly to the above.

The embodiments have been described in connection with the examples of the TFT array substrates used in the liquid crystal display devices. However, the invention is not restricted to the liquid crystal display devices, and may be applied to various kinds of semitransparent display devices having thin film transistors, transparent display regions and reflective display regions.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of manufacturing a semitransparent display device comprising the steps of:
    forming a light shield film over a transparent display region on a transparent substrate;
    applying a photosensitive organic film over said transparent substrate coated with said light shield film;
    exposing and developing said photosensitive organic film to form a through hole extending through said photosensitive organic film in said transparent display region;
    removing said light shield film exposed through said through hole after forming said through hole; and
    forming a reflective film above said photosensitive organic film to form a reflective display region.

2. The method of manufacturing the semitransparent display device according to claim 1, further comprising the step of:
    forming a thin film transistor on said transparent substrate, wherein said light shield film on said transparent display region is formed in said step of forming the thin film transistor.

3. The method of manufacturing the semitransparent display device according to claim 2, wherein
    said step of forming the thin film transistor includes the step of forming a conductive film on said transparent substrate, and the step of forming a gate electrode of said thin film transistor and said light shield film made of said conductive film on said transparent display region by patterning said conductive film.

4. The method of manufacturing the semitransparent display device according to claim 2, wherein
    said step of forming the thin film transistor includes the step of forming a conductive film on said transparent substrate, and the step of forming a source electrode and a drain electrode of said thin film transistor and said light shield film made of said conductive film on said transparent display region by patterning said conductive film.

5. The method of manufacturing the semitransparent display device according to claim 2, wherein
    said step of forming the thin film transistor includes the step of forming a conductive film on said transparent substrate, and the step of forming a channel layer of said thin film transistor and said light shield film made of said conductive film on said transparent display region by patterning said conductive film.

6. The method of manufacturing the semitransparent display device according to claim 2, wherein
    said light shield film is formed in a region formed of said transparent display region and a portion surrounding said transparent display region, and being wider than said transparent display region.

7. The method of manufacturing the semitransparent display device according to claim 2, wherein
    said light shield film is formed in said transparent display region except for a peripheral portion of said transparent display region.

8. The method of manufacturing the semitransparent display device according to claim 1, further comprising the step of:
    forming a contact hole extending through said photosensitive organic film on said transparent substrate, wherein
    said light shield film in said transparent display region is removed in said step of forming said contact hole.

9. The method of manufacturing the semitransparent display device according to claim 8, further comprising the step of
    forming said thin film transistor on said transparent substrate, wherein
    said step of forming said thin film transistor includes the step of forming a semiconductor layer on said transparent substrate, and the step of patterning said semiconductor film to form a channel layer of said thin film transistor and to form said light shield film made of said semiconductor film on said transparent display region.

10. A semitransparent display device comprising:
    a transparent substrate having a main surface;
    a light shield film made of a conductive film or a semiconductor film formed on the main surface of said transparent substrate; and
    a photosensitive organic film formed on the main surface of said transparent substrate covering said light shield film, said photosensitive organic film having an upper surface with irregularities formed therein, wherein:
    said display device comprises a transparent display region provided with a through hole, having side surfaces and a bottom surface, extending through said light shield film and said photosensitive organic film, and reaching the main surface of said transparent substrate; and
    the light shield film is provided around the side surface of the through hole, and the side surface of the through hole and the exposed surface of the light shield film is covered by a reflective film while at least a part of the bottom surface is not covered by the reflective film.

11. A semitransparent display device comprising:
    a transparent substrate having a main surface; and
    a photosensitive organic film formed on the main surface of said transparent substrate, wherein
    said display device comprises a transparent display region provided with a through hole extending through said photosensitive organic film and reaching the main surface of said transparent substrate, and
    said transparent substrate is provided at the main surface with a concavity formed at a peripheral portion of said through hole.

12. The semitransparent display device according to claim 11, further comprising:
    a transparent electrode formed along a bottom surface and inner side surface of said through hole and covering said concavity; and
    a reflective electrode formed along an upper surface of said photosensitive organic film and said inner side surface of said through hole and having a second through hole opposing said bottom surface of said through hole.

* * * * *